Sept. 5, 1939.　　　　H. A. WINTERMUTE　　　　2,172,304
GAS TREATER
Filed April 12, 1938　　　3 Sheets-Sheet 2

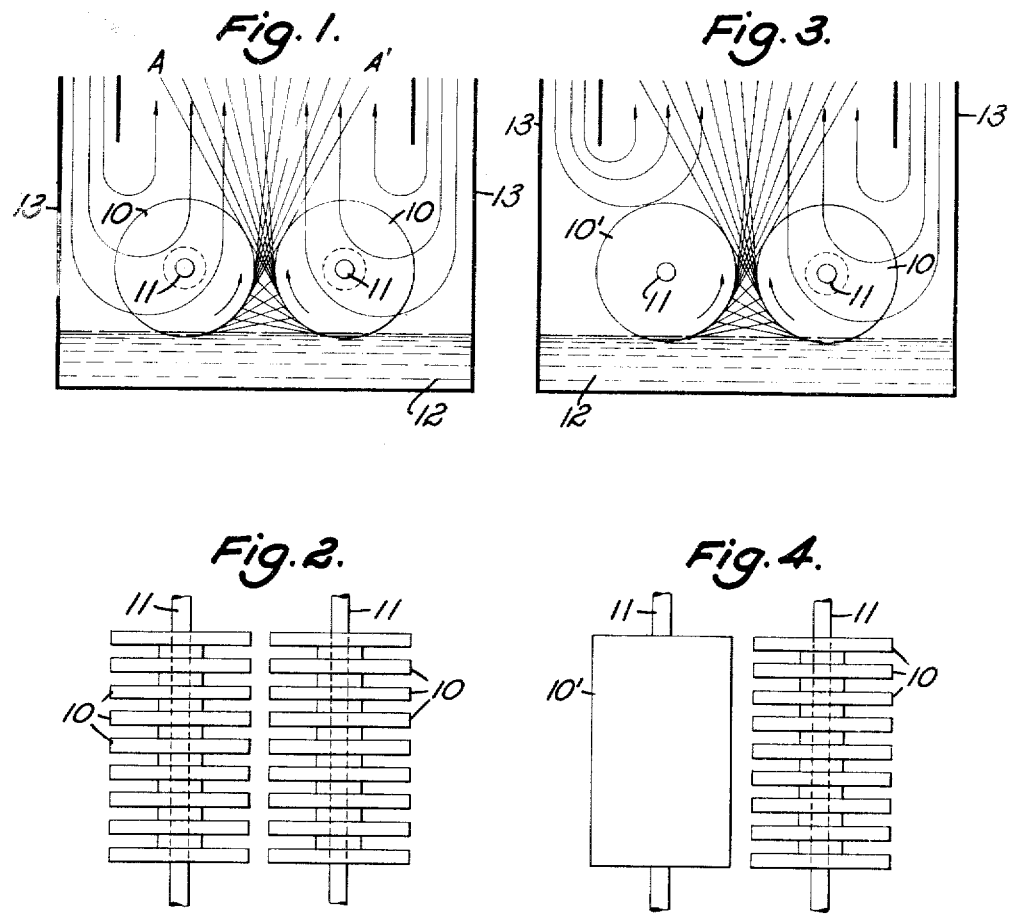

Inventor:
Harry A. Wintermute
By Potter, Pierce & Scheffler
Attorneys.

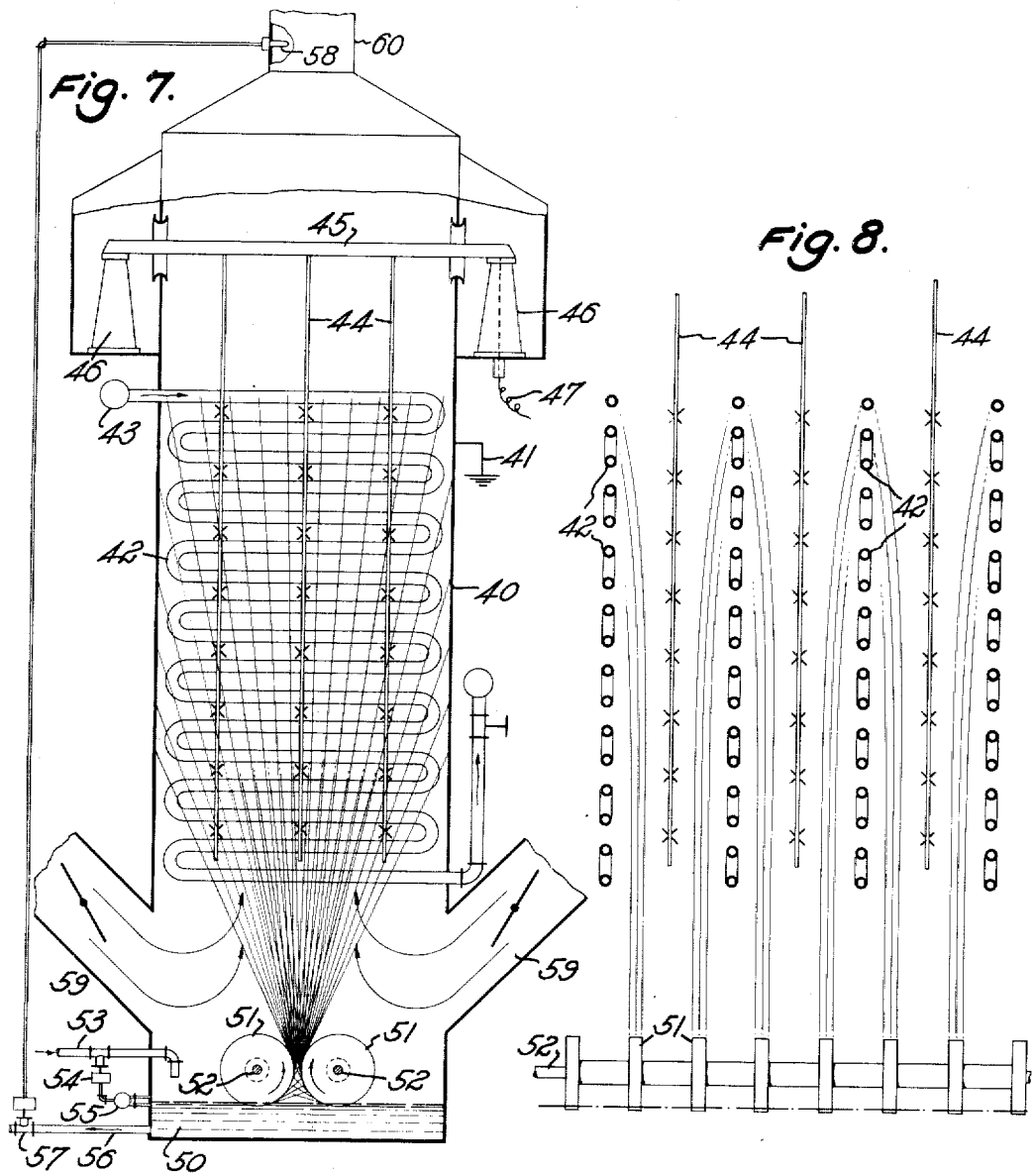

Patented Sept. 5, 1939

2,172,304

UNITED STATES PATENT OFFICE 2,172,304

GAS TREATER

Harry A. Wintermute, Plainfield, N. J., assignor to Research Corporation, New York, N. Y., a corporation of New York Application April 12, 1938, Serial No. 201,631

16 Claims. (Cl. 183—7)

This invention relates to gas treaters and particularly to apparatus including novel means for obtaining controlled and directed contact of a liquid with a gaseous stream. The invention is especially advantageous for the purpose of combining the direct contact of a liquid and a gas with other operations upon either the liquid or the gas or both.

The invention involves the use of a novel arrangement of spray means whereby highly directive streams or sheets of liquid particles may be projected into a gas stream, and provides a greater degree of control of the liquid particle streams than has heretofore been possible. This feature of the invention makes possible particularly advantageous arrangements of apparatus for adjusting the temperature, and humidity, of atmospheric air to comfort conditions or to conditions desired for industrial operations. Further advantages are presented when the removal of solid, liquid or gaseous constituents of the air are also desired. The invention is also adaptable with advantage to many industrial problems involving the contact or interaction of a gas and a liquid.

The spray device of the invention comprises a pair of opposed rotatable, horizontal, cylindrical members, positioned to dip into a supply of liquid, and spaced apart at a distance such that the exterior vertical angle between their intersecting common tangents is not more than about 90 degrees and, in general, is at least about 20 degrees, and preferably between about 40 and 60 degrees, whereby it is possible to confine the vertical angle of dispersion of the major portion of the projected liquid particles to a like range of magnitude. The sheet or stream of liquid particles produced by the spray device of the invention is subjected to a close control as to direction and area by adjusting the spacing and velocity of the cylindrical members.

While all of the spray is not confined within the indicated limits and a certain amount of fine mist is formed in addition to the directed stream of sprayed particles, this does not detract from the value of being able to direct a large proportion of the sprayed liquid within quite definite limits and in many applications this formation of mist is a decided advantage.

One or both of the cylindrical members may be advantageously subdivided into cylindrical disks or elements, whereby a greater control of the liquid particle projection streams and a more desirable distribution of the gas streams are made possible.

The invention will be more particularly described with reference to the accompanying drawings in which:

Fig. 1 is a diagrammatic elevation of one form of spray device embodying the principles of the invention;

Fig. 2 is a plan of the moving elements of Fig. 1;

Figs. 3 and 4 are views, corresponding to Figs. 1 and 2, respectively, of another form of spray device embodying the principles of the invention;

Fig. 7 is a diagrammatic elevation in partial section of a gas and liquid contact apparatus useful as a dehumidifying tower; and Fig. 8 is a fragmentary section transverse to the view of Fig. 7.

Figure 5:
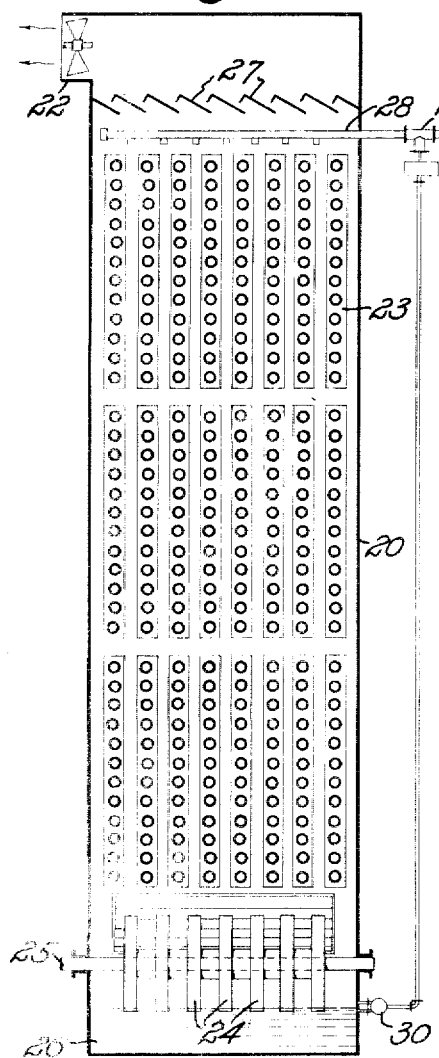
Fig. 5 is a diagrammatic sectional elevation of a gas and liquid contact apparatus useful as an evaporative cooling tower.

In Figs. 1 and 2, 10 are cylindrical disks mounted for rotation on shafts 11 and driven by any suitable power source (not shown), and dipping into a pool of liquid 12. Gas to be contacted with the liquid is supplied through ducts 13. The cylindrical members 10 are rotated toward each other in the direction indicated by the arrows and pick up water from the pool. The spacing of the members from each other is such that their intersecting common tangents (A—A' in Fig. 1) form a vertical angle of about 60 degrees in the case illustrated and thus provide a sheet or blanket of spray, the major portion of which is comprised within a vertical angle of dispersion of about 60 degrees. As an illustrative example, cylindrical disks 2 inches in thickness and 15 inches in diameter were spaced approximately 1½ inches apart and rotated at about 500 revolutions per minute. They produced a well defined sheet of spray particles confined largely within a vertical angle of about 50 degrees, and having a vertical extent of from 12 to 15 feet.

The result of the interaction of the opposed members and the liquid thrown therefrom at such velocities and spacings is that the liquid is projected upwardly in a stream of particles, the thickness and location of which is determined by the width and location of the cylindrical members, and the height and spread of which is determined by the spacing and velocity of rotation of the members. As will be seen later, this makes possible the projection of a blanket or sheet of finely divided liquid particles along or between other elements of a gas and liquid contact apparatus with a high degree of control and effectiveness and a correspondingly high efficiency of contact and of space utilization.

In the device of Figs. 3 and 4, in which like numbered elements correspond to the elements of Figs. 1 and 2, one of the rotating members is in the form of a complete cylinder 10'. The comparative distribution of the gas supplied from ducts 13 as indicated in Figs. 1 and 3 clearly shows the improved distribution of gas obtained by dividing one or both of the cylindrical members into a plurality of spaced cylindrical disks.

The rotating cylindrical members may be imperforate cylinders or cylindrical disks and may be made of any material of construction of suitable strength which will withstand whatever corrosive action the particular gas and liquid to be handled may have. For various purposes, the rotating members may, for example, be made of wood, metal, or plastic composition, and they may be suitably reinforced, and may be coated with corrosion or erosion-resisting coating compositions such as sheet rubber or phenolic resin varnishes. In general, a relatively smooth, even surface has been found to give very satisfactory results.

Figure 6:
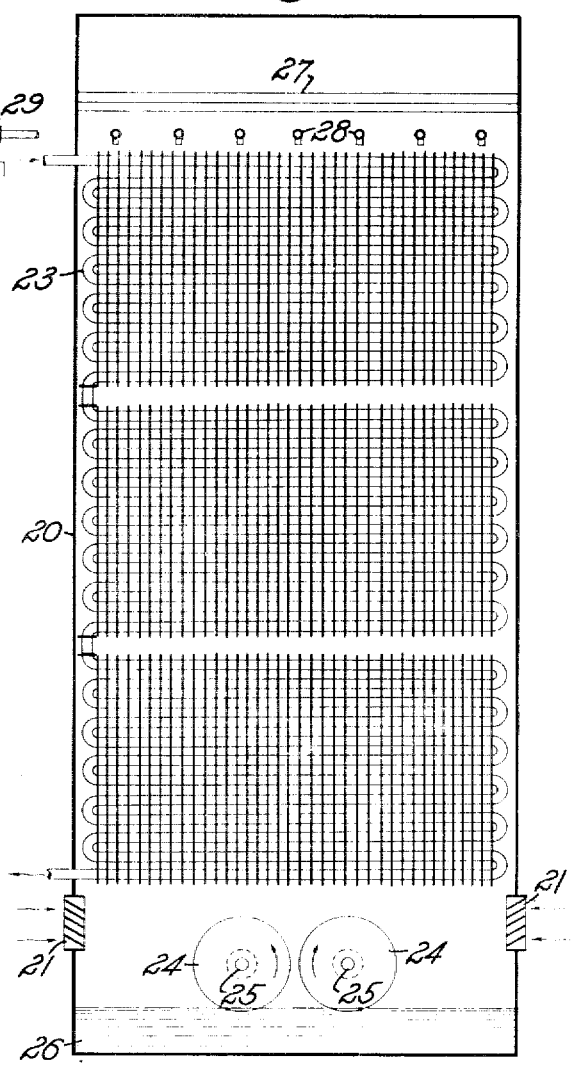
Fig. 6 is a sectional elevation transverse to the view of Fig. 5.

The apparatus shown in Figs. 5 and 6 will be particularly described as an evaporative cooling tower, although it is adaptable for a wide variety of uses and is merely illustrative of the principles of the invention. When used as an evaporative cooling tower, it provides means for flowing a fluid to be cooled in counter-current heat exchange relation with concurrent contacting streams of air and water.

In this apparatus a casing 20 is provided with air inlets 21 near the bottom and air outlets 22 near the top. Mounted in the casing are a plurality of extended surface coils 23 through which a fluid to be cooled is passed, preferably from top to bottom, as indicated. The various units of the coils 23 are positioned in a plurality of vertical groups so as to provide straight, uninterrupted paths between adjacent coils.

To obtain the highest degree of efficiency of the apparatus, it is essential that streams of water particles be maintained in the air stream throughout the passage of the air through the vertical paths between the extended surface coils and for this purpose a highly directive spray controllable as to shape and area is especially advantageous. Controlled sheets of spray are provided in this apparatus by the use of rotating cylindrical disks of the type described above.

In the lower portion of the apparatus below the extended surface coils are a pair of opposed cylindrical members comprising a plurality of cylindrical disks 24 mounted on shafts 25 for rotation in the direction indicated by the arrows. The disks are mounted to dip into the pool of water in sump 26, and are positioned vertically below the paths between the adjacent coils. They are spaced as described above, and this spacing and speed of rotation are so adjusted that the combined action of the spray device and the upward air current through the apparatus carries a substantial portion of the water particles to the upper end of the coils 23 so that the progressive equalization of water vapor tension, or dew point, of the air with the temperature of the water is maintained through the portion of the apparatus occupied by the coils. In this manner the fluid to be cooled entering at the top is progressively cooled down to a temperature approaching the dew point of the air entering the bottom of the coil. The excess water over that which evaporates into the air tends to return to the sump 26 over the surfaces of the coils and in this way increases the efficiency of heat transfer to the coils and is itself maintained, at each level of the apparatus, at a temperature approaching equilibrium with the wet bulb temperature of the air at that level so that the water returning to sump 26 is maintained at a temperature which tends to approach the dew point of the air entering the apparatus.

A certain amount of fine mist is produced by the interaction of the streams of liquid projected by the cylindrical members which is advantageous in insuring that the air in the lower part of the apparatus is brought quickly into contact with an extended surface of the liquid in the form of fine particles which are carried upward by the air current and are materially effective in bringing about a rapid establishment of equilibrium conditions.

Spray eliminators 27 are positioned at the top of the tower to remove liquid particles carried beyond the coils by the air stream and return the liquid to the top of the coils.

In order to avoid disturbing the equilibrium in the tower, make-up water to compensate for the amount of water evaporated into the air stream is admitted to sprays 28 through valve 29 which is controlled by constant level device 30. If the supply of make-up water is at a temperature lower than that corresponding to the dew point of the air leaving the coils, the make-up water is supplied to the apparatus at a point, below that indicated in the figures, where the equilibrium temperature in the apparatus is approximately that of the make-up water.

The apparatus shown in Figs. 7 and 8 will be particularly described as a temperature and humidity-regulating device, although as in the case of the apparatus of Figs. 5 and 6, it is adaptable for a wide variety of other uses. When used as a temperature and humidity-regulating device, it makes possible the adjustment of both the dry bulb temperature and the humidity of a gas, such as air, in a single operation while simultaneously eliminating all suspended materials from the gas including not only particles of treating fluid, but dust particles and the like contained in the gas to be treated. This is effected by subjecting the air simultaneously to the action of a cooling fluid, a humidity-regulating fluid, and a high tension electric field.

The principal elements of the apparatus are contained in a casing 40 which is grounded as shown at 41. Gas inlet means are provided at 59 and gas outlet means at 60. The inlet and outlet conduits may be suitably connected to a source of air and to a space to be conditioned, respectively, for the purpose of supplying conditioned air to such space. The bottom portion of the casing forms a sump 50.

Positioned in the casing are a plurality of vertically extending coils 42, connected through manifold 43 to a suitable source of cooling fluid. Positioned between adjacent vertical cooling coils are a plurality of attenuated elements 44 adapted to act as discharge electrodes under the influence of a high tension electric field. The electrodes 44 are suspended in spaced, insulated manner from member 45 carried on insulating bushings 46 and electrically connected at 47 to a terminal of a source of high tension, preferably unidirectional, current, not shown. Since the coils 42 are in electrical contact with grounded casing 40, the coils form complementary electrodes to discharge electrodes 44 in the manner of the well-known Cottrell electrical precipitation systems.

Below the coils and discharge elements are positioned a spray device comprising two rows of rotatable, paired cylindrical disks 51 mounted on shafts 52 for rotation in the direction indicated by the arrows. The disks 51 are mounted to dip into the liquid in sump 50, and a pair of disks is positioned vertically beneath the space between each vertical row of discharge elements 44 and the adjacent coils 42.

A suitable dehumidifying liquid, such as calcium chloride brine of predetermined concentration, is supplied to the sump through line 53. The supply is regulated by valve 54 governed by constant level device 55, while the removal of liquid to a reconcentrating device, not shown, is accomplished through line 56 advantageously regulated by valve 57 which is controlled by humidistat 58 in the exit conduit 60.

The disks 51 are spaced and rotated as described in connection with Figs. 1–4, and the spacing and speed of rotation are so adjusted that the combined action of the spray device and the upward current of air carries a substantial portion of the liquid particles to the top of the coils or, in the absence of an electric field, even beyond the top of the coils. However, as will be more clearly seen from Fig. 8 under the influence of the electric field impressed between electrodes 44 and coils 42, and the resulting discharge from electrodes 44, the liquid particles are gradually carried over to the coils 42, so that the air leaves the coils substantially freed of liquid particles as well as of dust and other suspended matter.

The spray device of the invention makes it possible to insure the complete, but controlled, wetting of the cooling coils 42 to the very top with dehumidifying liquid so that the air passing upward through the device is gradually brought by the combined action of the dehumidifying liquid and the coolant to a predetermined condition of temperature and humidity, the first determined by the temperature of the coolant supplied to the coils, and the second by the concentration of the dehumidifying liquid maintained in the apparatus.

A wire variety of applications of the present invention have been described and suggested and it will be seen that the invention broadly comprises gas and liquid contact apparatus whereby controlled contact of the liquid with the gas may be maintained, including a spray device comprising paired, rotatable, horizontal, cylindrical members, at least one of which is positioned to dip into a supply of liquid, said members being spaced apart at a distance such that the vertical angle between their intercepting common tangents is not more than about 90 degrees and, in general, is at least about 20 degrees, whereby the vertical angle of dispersion of the major portion of the projected liquid particles is confined within the range of approximately 20 to 90 degrees.

This application contains subject-matter in common with my application Serial No. 125,641, filed February 13, 1937.

I claim:

1. Gas and liquid contact apparatus comprising a casing, means providing a plurality of spaced conduits for the confined flow of fluid through said casing and defining at least one substantially straight, uninterrupted path for the flow of gas through said casing between said fluid conduit means, and means for providing a liquid spray in said path comprising a pair of rotatable cylindrical members of substantial thickness at the peripheral surface thereof having their planes of rotation in the same plane with each other and with said path, said members dipping at their lower edges in a body of liquid and said members being spaced apart at a distance such that the external vertical angle between their intersecting common tangents is not more than about 90 degrees.

2. Gas and liquid contact apparatus comprising a casing, means providing a plurality of spaced conduits for the confined flow of fluid through said casing and defining at least one substantially straight, uninterrupted path for the flow of gas through said casing between said fluid conduit means, and means for providing a liquid spray in said path comprising a pair of rotatable cylindrical members of substantial thickness at the peripheral surface thereof having their planes of rotation in the same plane with each other and with said path, said members dipping at their lower edges in a body of liquid and said members being spaced apart at a distance such that the external vertical angle between their intersecting common tangents is about 40 to 60 degrees.

3. Gas and liquid contact apparatus comprising a casing, means providing a plurality of spaced conduits for the confined flow of fluid through said casing and defining at least one substantially straight, uninterrupted path for the flow of gas through said casing between said fluid conduit means, and means for providing a liquid spray in said path comprising a pair of rotatable cylindrical members of substantial thickness at the peripheral surface thereof having their planes of rotation in the same plane with each other and with said path, at least one of said members dipping at its lower edge in a body of liquid, and said members being spaced apart at a distance such that the external vertical angle between their intersecting common tangents is not more than about 90 degrees.

4. Gas and liquid contact apparatus comprising a casing, extended surface coils providing a plurality of spaced conduits for the confined flow of fluid through said casing and defining at least one substantial straight, uninterrupted vertical path for the flow of gas through said casing between said fluid conduit means, and means for providing a liquid spray in said path comprising a pair of rotatable cylindrical members of substantial thickness at the peripheral surface thereof having their planes of rotation in the same plane with each other and with said path, said members dipping at their lower edges in a body of liquid and said members being spaced apart at a distance such that the external vertical angle between their intersecting common tangents is not more than about 90 degrees.

5. Gas and liquid contact apparatus comprising a casing, means providing a plurality of spaced conduits for the confined flow of fluid through said casing and defining at least one substantially straight, uninterrupted vertical path for the flow of gas through said casing between said fluid conduit means, means for providing a liquid spray in said path comprising a pair of rotatable cylindrical members having their planes of rotation in the same plane with each other and with said path, said members dipping at their lower edges in a body of liquid and said members being spaced apart at a distance such that the external vertical angle between their intersecting common tangents is not more than about 90 degrees, discharge electrode means positioned in said path and means providing a high tension electric field between said electrode means and said conduit means.

6. Gas and liquid contact apparatus comprising a casing, extended surface coils providing a plurality of spaced conduits for the confined flow of fluid through said casing and defining at least one substantially straight, uninterrupted vertical path for the flow of gas through said casing between said fluid conduit means, means for providing a liquid spray in said path comprising a pair of rotatable cylindrical members having their planes of rotation in the same plane with each other and with said path, said members dipping at their lower edges in a body of liquid and said members being spaced apart at a distance such that the external vertical angle between their intersecting common tangents is not more than about 90 degrees, discharge electrode means positioned in said path and means providing a high tension electric field between said electrode means and said coils.

7. Gas and liquid contact apparatus comprising extended surface members defining a straight, substantially uninterrupted path for the flow of gas therebetween, means for inducing a stream of gas between said extended surface members, means for providing a body of liquid spray substantially coextensive with said path comprising a pair of rotatable cylindrical members of substantial thickness at the peripheral surface thereof having their planes of rotation in the same plane with each other and with said path, said members dipping at their lower edges in a body of liquid and said members being spaced apart at a distance such that the external vertical angle between their intersecting common tangents is not more than about 90 degrees.

8. Gas and liquid contact apparatus comprising extended surface members defining a straight, substantially uninterrupted path for the flow of gas therebetween, means for inducing a stream of gas between said extended surface members, means for providing a body of liquid spray substantially coextensive with said path comprising a pair of rotatable cylindrical members of substantial thickness at the peripheral surface thereof having their planes of rotation in the same plane with each other and with said path, at least one of said members dipping at its lower edge in a body of liquid and said members being spaced apart at a distance such that the external vertical angle between their intersecting common tangents is not more than about 90 degrees.

9. Apparatus for providing a body of liquid spray substantially coextensive with a straight, substantially uninterrupted path comprising a pair of cylindrical members of substantial thickness at the peripheral surface thereof rotatably mounted on parallel axes, said members having their planes of rotation in the same plane with each other and with said path, said members dipping into a body of liquid and said members being spaced apart at a distance such that the external vertical angle between their intersecting common tangents is not more than about 90 degrees.

10. Apparatus for providing a body of liquid spray substantially coextensive with a straight, substantially uninterrupted path comprising a pair of cylindrical members of substantial thickness at the peripheral surface thereof rotatably mounted on parallel axes, said members having their planes of rotation in the same plane with each other and with said path, said members dipping into a body of liquid and said members being spaced apart at a distance such that the external vertical angle between their intersecting common tangents is about 40 to 60 degrees.

11. Apparatus for providing a body of liquid spray substantially coextensive with a straight, substantially uninterrupted path comprising a pair of cylindrical members of substantial thickness at the peripheral surface thereof rotatably mounted on parallel axes, said members having their planes of rotation in the same plane with each other and with said path, at least one of said members dipping into a body of liquid and said members being spaced apart at a distance such that the external vertical angle between their intersecting common tangents is not more than about 90 degrees.

12. Apparatus for providing a body of liquid spray substantially coextensive with a straight, substantially uninterrupted path comprising a pair of cylindrical members of substantial thickness at the peripheral surface thereof rotatably mounted on parallel axes, said members having their planes of rotation in the same plane with each other and with said path, at least one of said members dipping into a body of liquid and said members being spaced apart at a distance such that the external vertical angle between their intersecting common tangents is between about 40 and 60 degrees.

13. Gas and liquid contact apparatus comprising a casing, means providing a plurality of spaced conduits for the confined flow of fluid through said casing and defining at least one substantially straight, uninterrupted path for the flow of gas through said casing between said fluid conduit means, discharge electrode means positioned in said path, means providing a high tension electric field between said electrode means and said conduit means, and means for projecting a controlled extended stream of liquid particles into the space between said electrode means and said conduits without impingement on said discharge electrode means.

14. Gas and liquid contact apparatus comprising a casing, means providing a plurality of spaced conduits for the confined flow of fluid through said casing and defining at least one substantially straight, uninterrupted path for the flow of gas through said casing between said fluid conduit means, discharge electrode means positioned in said path, means providing a high tension electric field between said electrode means and said conduit means, means providing a pool, and means for projecting a controlled extended stream of liquid particles from said pool into the space between said electrode means and said conduits without impingement on said discharge electrode means.

15. Gas and liquid contact apparatus comprising a casing, extended surface coils providing a plurality of spaced conduits for the confined flow of fluid through said casing and defining at least one substantially straight, uninterrupted path for the flow of gas through said casing between said coils, discharge electrode means positioned in said path, means providing a high tension electric field between said electrode means and said coils, and means for projecting a controlled extended stream of liquid particles into the space between said electrode means and said coils without impingement on said discharge electrode means.

16. Gas and liquid contact apparatus comprising a casing, extended surface coils providing a plurality of spaced conduits for the confined flow of fluid through said casing and defining at least one substantially straight, uninterrupted vertical path for the flow of gas through said casing between said coils, discharge electrode means positioned in said path, means providing a high tension electric field between said electrode means and said coils, means providing a pool, and means for projecting a controlled extended stream of liquid particles from said pool into the space between said electrode means and said coils without impingement on said discharge electrode means.

HARRY A. WINTERMUTE.

CERTIFICATE OF CORRECTION.

Patent No. 2,172,304. September 5, 1939.

HARRY A. WINTERMUTE.

It is hereby certified that error appears in the printed specification of the above numbered patent requiring correction as follows: Page 3, second column, line 50, claim 4, for the word "substantial" read substantially; and that the said Letters Patent should be read with this correction therein that the same may conform to the record of the case in the Patent Office.

Signed and sealed this 3rd day of October, A. D. 1939.

(Seal)

Henry Van Arsdale,
Acting Commissioner of Patents.

ing a casing, extended surface coils providing a plurality of spaced conduits for the confined flow of fluid through said casing and defining at least one substantially straight, uninterrupted vertical path for the flow of gas through said casing between said coils, discharge electrode means positioned in said path, means providing a high tension electric field between said electrode means and said coils, means providing a pool, and means for projecting a controlled extended stream of liquid particles from said pool into the space between said electrode means and said coils without impingement on said discharge electrode means.

HARRY A. WINTERMUTE.

CERTIFICATE OF CORRECTION.

Patent No. 2,172,304. September 5, 1939.

HARRY A. WINTERMUTE.

It is hereby certified that error appears in the printed specification of the above numbered patent requiring correction as follows: Page 3, second column, line 50, claim 4, for the word "substantial" read substantially; and that the said Letters Patent should be read with this correction therein that the same may conform to the record of the case in the Patent Office.

Signed and sealed this 3rd day of October, A. D. 1939.

(Seal)

Henry Van Arsdale,
Acting Commissioner of Patents.